United States Patent [19]

Johnson

[11] 4,132,755

[45] Jan. 2, 1979

[54] PROCESS FOR MANUFACTURING RESIN-IMPREGNATED, REINFORCED ARTICLES WITHOUT THE PRESENCE OF RESIN FUMES

[76] Inventor: Jay Johnson, 3225 N. Verdugo, Glendale, Calif. 91208

[21] Appl. No.: 903,212

[22] Filed: May 5, 1978

Related U.S. Application Data

[63] Continuation-in-part of Ser. No. 818,068, Jul. 22, 1977, abandoned.

[51] Int. Cl.$^2$ ............................................. B29J 5/00
[52] U.S. Cl. ................................... 264/553; 264/102; 264/112; 264/258; 425/389; 425/405 R
[58] Field of Search ................... 264/90, 92, 101, 102, 264/257, 258, 309, 112, 121; 425/127, 389, 405 R

[56] References Cited

FOREIGN PATENT DOCUMENTS 944955  12/1963  United Kingdom ..................... 264/257

Primary Examiner—Jan H. Silbaugh
Attorney, Agent, or Firm—Keil, Thompson & Shurtleff

[57] ABSTRACT

A technique for the manufacture of a resin-impregnated, reinforced article while resin fumes are prevented from escaping into the surrounding atmosphere. In this technique a permeable reinforcing material, for example of fiberglass, is deposited on a mold or on a structure to be reinforced; a sheet of perforated material (preferably flexible) is placed over the reinforcing material, with the marginal areas of this sheet preferably sealed to the mold so as to define an inner chamber; a sheet of impervious flexible material is placed over the sheet of perforated material, with the marginal areas of the impervious sheet sealed to the mold so as to define an outer chamber; the inner chamber is effectively connected to a vacuum source so as to draw the impervious sheet and, along with it the perforated sheet, against the reinforcing material; and the outer chamber is connected to a source of catalyzed resin so that resin is passed from the outer chamber into the reinforcing material through the perforations of the first-mentioned sheet. In this manner the material is substantially evenly impregnated with resin without the escape of resin fumes into the surrounding atmosphere. The articles thus produced are stronger because the reinforcement-to-resin ratio is enhanced. Also, interface adhesion and air inhibiting problems are avoided. A wide range of laminates may be used with this technique and it is suitable in connection with molds and structures of widely different shapes and sizes.

7 Claims, 7 Drawing Figures

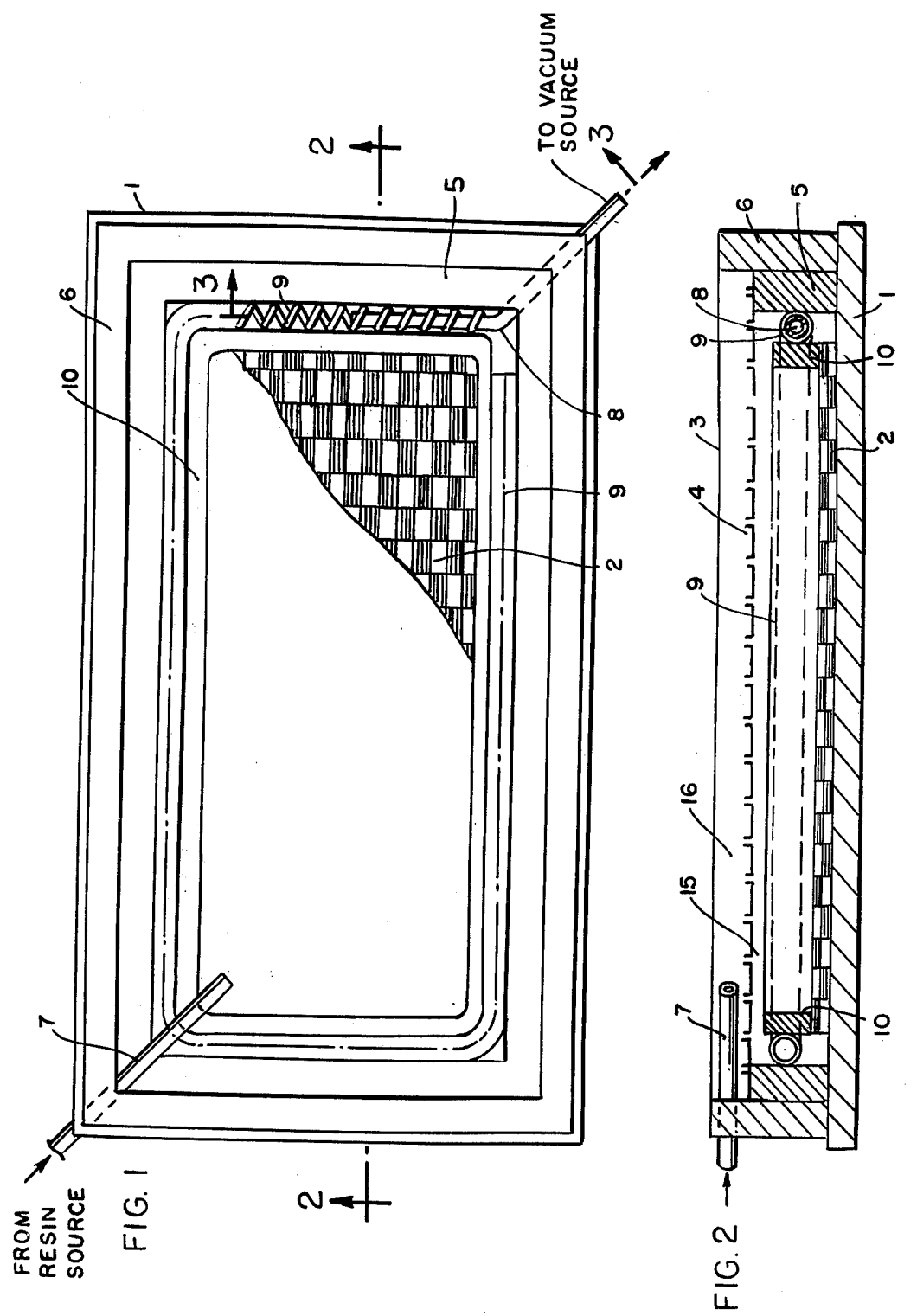

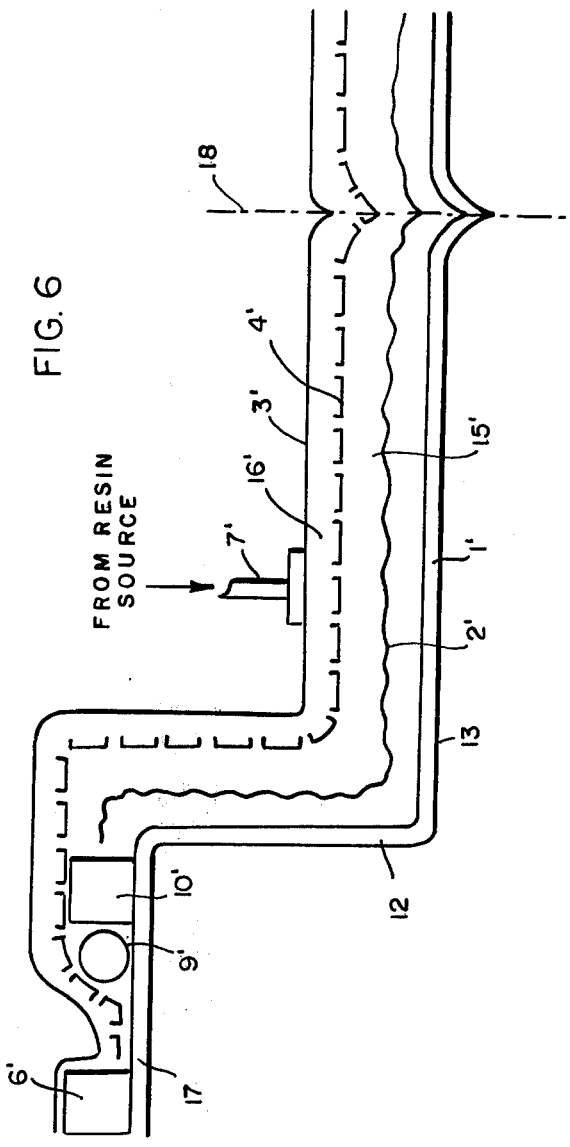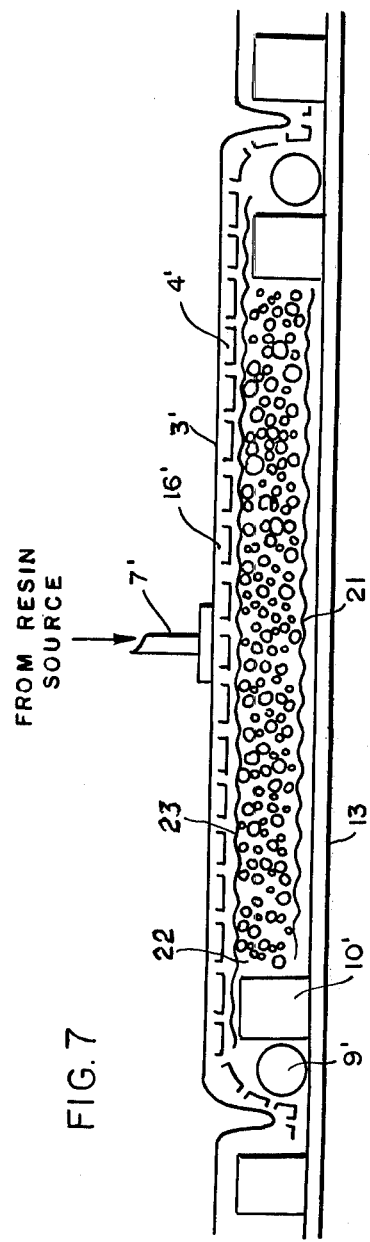

PROCESS FOR MANUFACTURING RESIN-IMPREGNATED, REINFORCED ARTICLES WITHOUT THE PRESENCE OF RESIN FUMES

RELATED APPLICATION

The present application is a continuation-in-part of application Ser. No. 818,068, which was filed July 22, 1977, now abandoned.

BACKGROUND OF THE INVENTION

The invention relates to a process and apparatus for manufacturing resin-impregnated, reinforced—particularly fiberglass reinforced--articles in such a way that the styrene or other volatiles in the reinforcing structure or "laminate" cannot escape into the surrounding atmosphere.

A technique used in the production of fiberglass parts for many years has become known in the art as "preforming". In this method an auxiliary mold revolves in the center of a chamber. The auxiliary mold is made of a screen similar to the type used for screen doors and it has the approximate shape of the matched die mold which is used to form the final part. A vacuum fan exhausts the area behind the auxiliary mold while it rotates in the center of the chamber. Chopped fiberglass is blown into the auxiliary mold and because of the vacuum is evenly distributed across the face of this mold. A fine mist of some type of adhesive, usually a cross linking resin emulsion is sprayed simultaneously onto the part. After the desired thickness of chopped fiberglass has been obtained the cutter and spray system stop and the mold is baked under infrared lights or some other heat source until tack free.

When the baking process has been completed the fiberglass mat now formed in the shape of the auxiliary mold is removed easily from the screen. This "preformed" mat is then transferred to the die mold onto which a measured quantity of catalized resin is poured. The male and female molds are pressed together under great pressure. The resin is forced through the thousands of cut strands of fiberglass until it has impregnated all vacancies. Heat is then often applied to the mold surfaces and the resin cures quickly. The matching mold sections are then pulled apart and the finished fiberglass part is produced smooth on both sides.

This known preforming technique has the disadvantage that it requires the use of expensive matched die molds usually made of metal. In addition it is subject to the drawback that the odorous resin fumes escape into the work atmosphere while the molds are open.

Another technique for producing fiberglass parts is known as "vacuum bagging". In the vacuum bag process a single cavity mold is employed and a normal fiberglass part is laid-up or sprayed-up in this mold. In this process the resins of necessity must be catalyzed very slowly to allow for the completion of the normal laminating time plus the process of the vacuum bagging.

In the vacuum bagging technique a fiberglass part is produced in its entirety. Then a gum-like tape is applied around the entire periphery. A sheet of thin plastic substance is draped over the entire laminate. This sheet of plastic adheres around the edges to the gummed vacuum tape. A vacuum hose is placed through the vacuum tape and sealed so that when a vacuum source is connected to this hose a vacuum is developed inside the vacuum bag, the latter being formed by the combination of the mold and the plastic sheet. As the vacuum continues, atmospheric pressure pushes down on the sheet and presses it against the wet fiberglass laminate. Excess resin is squeezed from the part and captured by absorption strips placed at various points about the laminate.

The vacuum is allowed to remain on the part until the resin has hardened. The plastic sheet is then simply removed from the part as there is no adhesion between resins and this type of covering. A very strong, even and smooth fiberglass part is produced this way and most such parts which call for considerable mechanical strength, such as aircraft parts and missile parts, are manufactured with this technique using epoxy resins. However, the open resin laminate which is present, until the vacuum bag is put in place, gives rise to the presence of resin odor in the work environment. Further, the process is messy and human contact with the resin is inevitable.

U.S. Pat. No. 2,913,036 to Smith shows a modification of this vacuum bagging technique in which laying-up or spraying-up of the laminate is avoided. In the arrangement disclosed in this patent one or more layers of fiberglass mat or fiberglass cloth is laid on top of a large upwardly convex mold. On top of this fiberglass in turn an impermeable sheet of plastic material or the like is laid and the periphery of this sheet is joined in airtight fashion to a flange at the bottom of the mold. A vacuum line is connected to several openings in the top of this sheet and a vacuum chamber is formed in this manner. A resin line is likewise introduced into this chamber, namely into a circumferential trough at the bottom thereof, and a plurality of hollow members of relatively rigid materials which are unconnected to any of the other elements of the assembly are also placed in this chamber. These members form a network of veins or arteries which extend throughout the aforementioned chamber as an aid in the distribution of the resin. The members may be embedded between layers of fiberglass fabric in the molded article; in that case the aforementioned arteries themselves become a part of the final casting and they typically appear in the form of reinforcing ribs.

In the apparatus disclosed in the Smith patent then, the resin which is introduced into the vacuum bag at the base of the upwardly convex mold, must be drawn up by the vacuum, initially in a straight vertical direction and then vertically and radially, into the laminate against the action of gravity. It is clear, therefore, that with such a design a uniform distribution of the resin throughout the entire extent of the laminate, if at all possible, is extremely difficult to attain.

A further example of a vacuum bag technique is described in British Pat. No. 944,955.

OBJECTS AND SUMMARY OF THE INVENTION

It is an object of the invention to provide a novel process and apparatus for manufacturing resin-impregnated, reinforced articles which avoids the shortcomings of the above prior art techniques.

It is a more specific object of the invention to produce high quality fiberglass reinforced articles with the use of the inexpensive type of fiberglass molds such as are commonly used in the hand lay-up or spray-up method.

It is another object of the invention to reinforce flexible sheets with resin impregnated fiberglass in a simple manner.

It is a further object of the invention to produce articles in a simple and inexpensive way and with a minimum of handling of mold parts or parts to be reinforced. It is another object of the invention to produce such articles without the escape of styrene molecules or other volatiles into the workmen's atmosphere and thus without the presence of fumes in the atmosphere.

In this connection it is another object of the invetion to produce such articles while providing a cleaner work area than was possible in the case of the spray-up or lay-up method, and without the requirement of special ventilation facilities or of spray booths and the like, and with less fire hazard.

A further objective is to save the substantial energy lost in heated "make up" air that spray booths loose in colder climates while extracting resin fumes from the work area of spray-up and lay-up shops.

It is still another object of the invention to produce articles of this general kind in which less resin is used, that is in which the reinforcement-to-resin ratio is larger, and which as a result are stronger and lighter.

It is yet a further object of the invention to produce such articles while avoiding the air inhibiting effect on the surface of the resin.

It is another object of the invention to produce such articles in which interface adhesion problems, as are encountered between the multiple layers in the cases of articles manufactured by the spray-up or lay-up method, are avoided.

It is yet another object of the invention to produce articles of the kind mentioned without a degradation or "washing" of the random pattern of the glass as the resin flows, regardless of the particular kind of reinforcing laminate used.

Briefly the foregoing and other objects are met according to the invention by a "bag within a bag" technique. More particularly, in this technique a perforated sheet preferably of flexible material is placed over the laminate, with the marginal areas of this sheet sealed—directly by distinct sealing means, such as gummed tape, or indirectly by virtue of the vacuum applied in operation—to a single cavity mold or to the structure to be reinforced, to define an inner chamber; over this sheet of perforated material a sheet of impervious flexible material is placed, with the marginal areas of this impervious sheet sealed to the mold so as to define an outer chamber; the inner chamber is connected to a vacuum source so as to draw the impervious sheet, along with the perforated sheet against the laminate and mold surface. The outer chamber is then connected to a resin source. With this technique the resin, instead of flowing longitudinally through the glass fibers and giving a "washing" effect which orients these fibers, is evenly distributed through the many pinhole-like apertures in the perforated sheet. In this manner each drop of resin reaches every corner of the laminate without flowing lengthwise through the glass reinforcement. Eventually all of the resin is drawn through the large number of perforated holes and distributed evenly through the laminate.

The perforated sheet is preferably formed of a flexible material such as nylon or Mylar or the like. In another embodiment, the perforated sheet can be formed of a thin malleable material which can be shaped to fit over the laminate and be reused many times.

The invention can be described primarily in connection with a single cavity mold. As is apparent, however, the "bag within a bag" technique can also be employed in the absence of a mold. As an example, a flexible plastic sheet can be reinforced by the present technique. Acrylic sheets of appropriate thickness and color that form the outer surface of a bathtub, shower stall, wash basin, and the like, can be draped with a flexible matrix material (i.e. fiberglass mat, paper mat, multiple layers of tissue paper, cardboard, burlap, etc.) whereupon the double vacuum bag of the subject invention is applied and resin introduced to the areas requiring reinforcing.

BRIEF DESCRIPTION OF THE DRAWINGS

Preferred embodiments of the invention will now be described with reference to the accompanying drawings in which:

FIG. 1 is a plan view of the entire molding assembly according to one embodiment of the invention, the mold in this embodiment being of the planar type.

FIG. 2 is a cross section taken through line 2—2 of the assembly shown in FIG. 1.

FIG. 6 is a schematic cross sectional view of a molding assembly generally similar to that shown in FIG. 5, except that in this modification no separate sealing means have been provided for sealing the margin of the perforated sheet to the mold, reliance being had, instead, on the impervious sheet for pulling the perforated sheet, under the effect of the vacuum, against the surface of the mold or structure, in operation.

FIG. 7 is a schematic cross sectional view of a molding assembly generally similar to that of FIG. 6, except that in this modification the permeable reinforcing material is a syntactic foam comprised of an aggregate core material sandwiched between two fiberglass reinforcing sheets; and that the mold or structure to be reinforced has been assumed to have a straight horizontal surface.

DESCRIPTION OF THE PREFERRED EMBODIMENTS

Referring first to FIG. 1, numeral 1 is a "single cavity" mold which in this embodiment is simply in the form of a plate, for example of fiberglass. Laminate 2 which is placed dry on top of this mold, in FIGS. 1 and 2 is assumed to be in the form of a fiberglass cloth. However, a woven roving, continuous roving mat or chopped mat may also be used instead of, or in addition to, the cloth. Furthermore, and explained in more detail below, chopped fibers, continuous roving or certain aggregate fillers can also be used for this laminate if desired.

Figure 4:
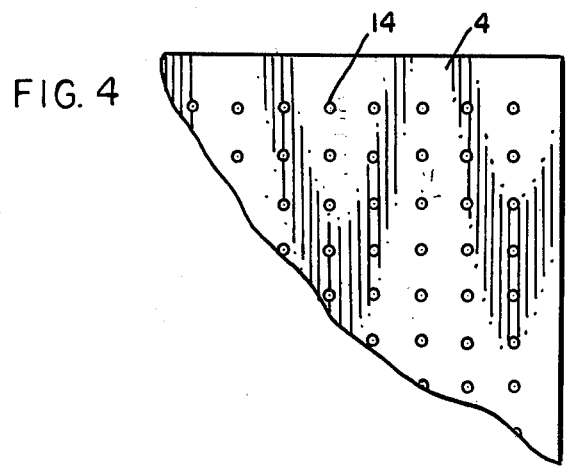
FIG. 4 is a top view of the perforated sheet.

A perforated sheet or film 4 of usually but not necessarily, flexible, preferably plastic, material is laid on top of the reinforcement material 2 and, as will be seen from FIG. 4, the perforations of this sheet consist of a large number of narrow transverse apertures 14 which are provided all over the sheet in a preferably, but not necessarily, regular pattern. These perforation holes 14 may be, for example, approximately ⅛" apart and be minute slits or holes of approximately 0.010" to 0.050"

in diameter. Perforated sheets of this kind are commercially available. Since the material of this perforated sheet, as well as that of the outer permeable sheet 3 described below, are preferably of transparent material, these sheets are not visible in the top view FIG. 1. The perforations 14 have been schemtically indicated in the cross section FIG. 2 but since these holes are of such small diameter, they are barely discernible when viewed from above.

Figure 3:
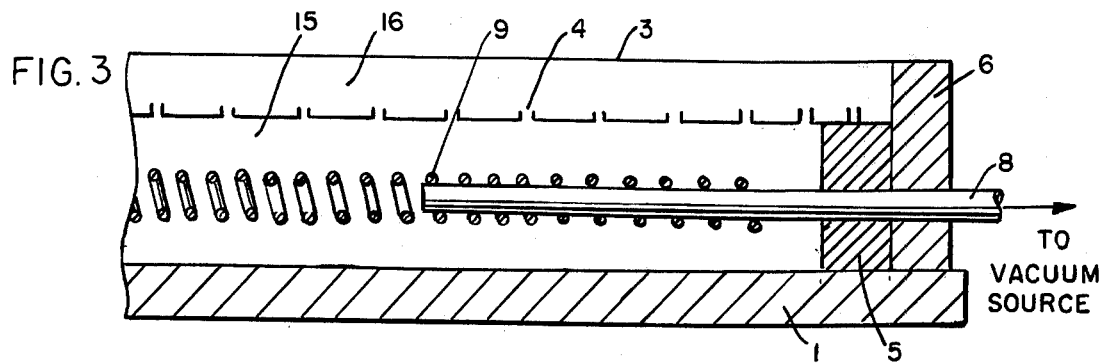
FIG. 3 is a slightly enlarged cross section taken along lines 3—3 of the assembly shown in FIG. 1.
Figure 5:
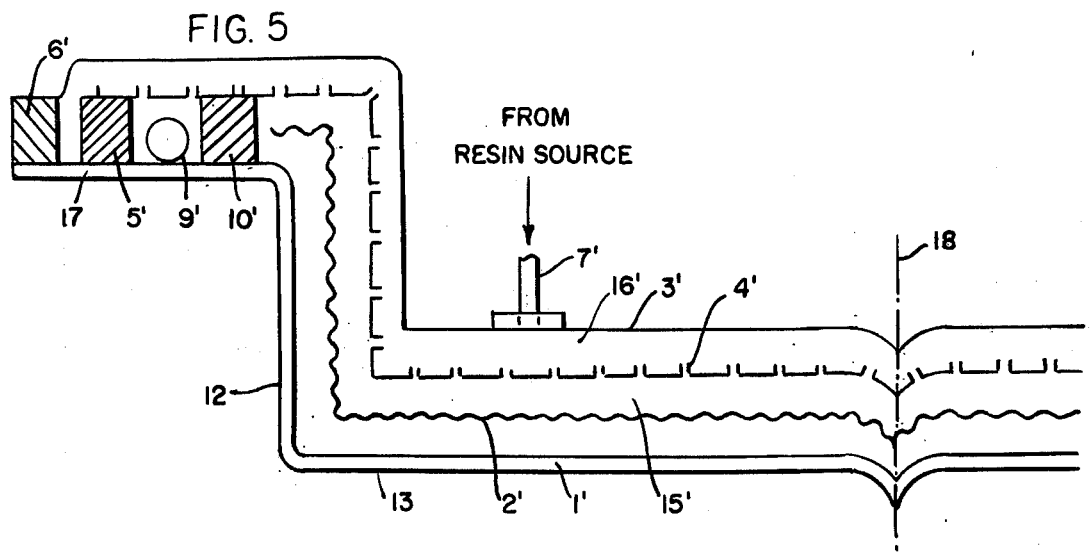
FIG. 5 is a schematic cross sectional view of a molding assembly according to another embodiment of the invention, the mold in this case being in cross section of generally U-shaped configuration similar to that of a boat mold.

As will be seen from the drawing, the edge portions of perforated sheet 4 is placed on top of an inner double-backed gum-like tape which has been placed in generally annular fashion around fiberglass mat 2 on mold 1; alternatively tape 5 may first be laid around the margin of perforated sheet 4, whereupon the annular tape 5 carrying sheet 4 is placed against mold 1. Another alternative shown in FIGS. 6 and 7 is to allow perforated sheet 4 to seal itself against mold 1 without the use of tape 5. A sufficient seal against mold 1 is formed automatically after the vacuum has pulled the impervious sheet 3 and hence perforated sheet 4 against the mold surface 1. In either case perforated sheet 4 in some fashion is relatively sealed around its circumference to mold 1 and thus an inner chamber, designated 15 in FIGS. 2 and 3 and 15' in FIG. 5 is defined.

In a similar manner impermeable sheet 3 which is of flexible and preferably plastic material is placed over the entire mold and it is sealed along its margin against mold 1 by a means of an outer, likewise annular-shaped, double-backed gum-like tape 6. Impervious sheet 3, in any case, must be totally sealed against mold 1 as differing from an optional seal of perforated sheet 4. Between sheets 3 and 4 an outer chamber is thus defined which has been designated 16 in FIGS. 2 and 3 and 16' in FIG. 5. As will be noted from FIGS. 1, 2 and 5, an annular strip 10 of carpeting or other absorbent material has been laid whose function will be explained hereinbelow. Provisions in the form of a hose or tube 7 connected at its outer end to a resin tank or dispensing machine (not particularly shown) have been made to introduce liquid catalyzed resin, preferably under some positive pressure, into the outer chamber 16. As shown in FIGS. 1 and 2, tube 7 has been inserted into this outer chamber in sealed fashion through outer tape 6, for example a corner of this tape or through some other filling device that has penetrated sheet 3 similar to shown by 7' in FIG. 5.

In generally similar form another hose or tube 8 whose outer end is connected to a vacuum source (not shown in the drawings) has been introduced into inner chamber 15, namely in sealed relationship through the lower right-hand corners of tape 6 and tape 5 in series. As will be observed from FIGS. 1, 2 and 3, the inner, slightly bent end of tube 8 has been shoved into one end of a coiled spring 9 which loosely overlies, in generally annular, "tail-eating" configuration, resin absorbing material 10. This coil spring serves to evenly distribute the subatmospheric pressure produced by the vacuum source, over the entire interior of inner chamber 15, namely through the narrow interstices between the individual turns of the coil spring. Some resin absorbing materials 10 are porous enough to replace spring 9 and distribute the vacuum evenly through chamber 15. This is to say—the spring 9, is effective, but not essential.

In the operation of the assembly shown in the drawings a vacuum is developed by effectively connecting tube 8, for example by the opening of a valve not shown, to the vacuum source. This vacuum forces the outer plastic sheet 3 down tightly against perforated sheet 4. While, by virtue of sheet 4, there has in effect been formed a "bag within a bag" it should be noted that, because of the vacuum, there is no longer a space between the two layers.

When a full vacuum has been reached the laminate 2 has been compressed by sheets 3 and 4 being forced against the laminate under the action of the outside atmospheric pressure, and all the air has been evacuated. A precise amount of resin is mixed with catalyst or hardner in the closed tank or dispensing machine, not shown, and tube 7 is effectively connected to this resin source, for instance, by means of a valve, also not particularly shown; hence resin is carried between the two sheets in chamber 16, and the vacuum present in the chamber 15 pulls the liquid resin downwardly through holes 14 and evenly through the fiberglass laminate or aggregate 2, to the mold. I have found that a small amount of pressure on the resin moves the resin very quickly over the entire laminate. As previously indicated this keeps the resin from flowing horizontally through the glass fibers and giving rise to a "washing" effect but, instead, causes the resin to be uniformly distributed by way of the many restricted transverse openings provided by the perforated sheet, over and through the entire laminate. With the perforated sheet 4 reasonably sealed at its edges the only place the resin can go is into the evacuated area below the perforated sheet, that is into the laminate. As can readily be seen, the glass laminate provides an excellent bed for a vacuum, with thousands of passages for air and resin to travel through on their way to the vacuum source. I have succeeded in making some extremely high-quality polyester laminates using the technique according to the invention, some of these laminates approaching aircraft standards. This represents an extraordinary advance in the industrial production of fiberglass articles.

When the resin reaches the vacuum source, the resin supply is turned off. The vacuum is allowed to continue until the catalyzed resin has set. At that time the two plastic sheets are simply peeled off of the laminate and the fiberglass laminate which exhibits a relatively smooth surface is complete. The process of the invention also prevents what is referred to as "air-inhibiting" of the resin surface which, in the spray-up or lay-up method of the prior art is an exposed surface. In short, in my technique the oxygen in the air is prevented from resulting in cross linking with the resin system.

It will be appreciated from the foregoing description that the technique according to the invention, while effecting even distribution of the resin, provides a barrier between the resin and the atmosphere so that no resin fumes can escape. Thus, a cleaner work area is made possible, special ventilating facilities or spray booths, and the like, can be dispensed with, and the fire hazard is greatly reduced. Moreover, due to the effectiveness of the vacuum in drawing the resin evenly into the reinforcement the amount of resin required is reduced or, otherwise expressed the reinforcement-to-resin ratio and hence the strength of the produced article is increased. Also, adhesive problems as are encountered between the various successively applied layers of the prior art articles produced by the lay-up or spray-up method are eliminated.

Referring again to the carpeting or resin absorbing material 10 placed circumferentially around the laminate, the presence of this material causes excess resin to be absorbed before it reaches coil spring 9 or the vacuum source. In this connection it may be mentioned that when, upon turning on of the vacuum, sheets 4 and 3 have been pulled down against laminate 2, these sheets wrap themselves around more than 50% of the cross sectional periphery of the coil spring, thereby reducing the open area of the coil and hence enhancing its effectiveness in distributing the vacuum. It may further be noted that carpeting material—or, for that matter, other porous material such as tissue paper or the like—can also be used for the purpose of absorbing excess resin and distributing vacuum evenly. Also, the end of the resin tube 7 extending into outer chamber 16 could be designed with flow inhibiting tips to reduce the velocity with which the resin enters the laminate.

As another optional expedient, where the shape of the article presents some difficult areas the resin can be forced to every nook and cranny of the mold by using a roller or a squeegee. This roller or squeegee never comes in contact with the resin but rather moves the resin between the two plastic sheets by rolling or squeegeeing a wave of resin in front of the roller or squeegee as it moves. This technique is not always required but it makes the process more versatile and hastens the delivery of resin to every perforated hole. When the resin cures the impervious sheet and the perforated sheet release immediately from the part leaving a relatively smooth interior surface without the customary labor involved in rolling or squeegeeing the laminate.

For the laminate one or more fiberglass mats, cloths or woven rovings may be employed as mentioned, but it is also possible to incorporate in the laminate a sheet of wood or foam or loose aggregate, an example being a sheet of "end grain" balsa wood about ½" thick or common peg board, thus being "wetted out" simultaneously with the fiberglass. The laminate thus obtained in this example weighs 1½ lbs. per square foot--which is the same weight as that of a 3/16" laminate manufactured with a spray-up gun--but it is several times stronger than this spray gun produced laminate.

I have found a syntactic foam can be manufactured simultaneously by this method. As shown in FIG. 7, which in part uses the reference numerals of FIG. 5 described below, this syntactic foam is used as a core material between two fiberglass reinforcement sheets forming a sandwich. The syntactic foam is made by first laying down a layer 21 of fiberglass reinforcement. An aggregate material 22, such as Pearlite, vermiculite, glass bubbles or a similar aggregate is then placed loosely on the fiberglass reinforcement 21 to the desired thickness. An encapsulating layer 23 of fiberglass reinforcement is placed over the top of this loose aggregate. The "bag within a bag" is then applied and after the vacuum has been established within the entire laminate, resin is then introduced through line 7'. The resin fills all of the interstices not only in the fiberglass, but completely through and around the aggregate, thus forming, by definition, a syntactic foam. Successful laminates to 1 and 1½ inches thick have been made using the described technique using a variety of aggregates and fillers.

Aternatively, or in addition, to fiberglass mat, cloth or woven roving it is also possible to project chopped fiberglass or continuous roving onto the mold or the part simultaneously with a fine fog spray of adhesive. This adhesive is a non-toxic material such as a cross linking polyvinylchloride or a polyvinylacetate although many other types of adhesives also work well. Many such materials are readily available from a variety of suppliers under various trade names and these commercial materials work reasonably well, also.

The purpose of the adhesive is to provide a tacky substance on the fiberglass roving. This allows the roving to stick on vertical surfaces as well as to remain oriented to the previous strands "shot" on the mold. After a suitable amount of fiberglass has been deposited on the mold and the adhesive allowed to "tack", the two plastic sheets are placed on the mold in the manner described and the vacuum is then drawn on the fiberglass. This removes all of the air trapped between the fiberglass strands. The amount of adhesive used is so small that no film as such is present.

In the embodiment above described it was assumed that the mold was simply in the form of a plate. However, the process according to the invention can be practiced with a wide variety of other mold configurations. In particular upwardly convex or concave molds may be employed.

Thus, in FIG. 5 an alternative embodiment has been schematically depicted in which the article to be molded, in cross section has the shape of an upwardly open U and, more specifically, the configuration of the hull of a boat. In FIG. 5 in which only the left half of the U-shaped molding assembly has been shown, with the line of symmetry or the keel line denoted as 18, similar parts have been given the same designation as in FIGS. 1 to 4 except that these designations have been primed in FIG. 5.

The mold 1', FIG. 5, is correspondly U-shaped in cross section and thus, in addition to its base section 13, has two upwardly extending side sections 12; moreover, the mold is provided with two flange portions 17 which extend horizontally outwardly from the ends of the respective side sections 12. The sealing means for the two plastic sheets are attached to the upper surfaces of these flange portions 17. More specifically, flange portions 17 carry the generally annular sealing tapes 5' which in turn is attached to the marginal portion of perforated sheet 4' and outwardly thereof, they carry the generally annular sealing tape 6' for the impervious sheet 3'. Also placed on these flange portions 17, namely inwardly of gummed tape 5', is coil spring 9', which likewise runs generally annularly around the mold and is connected to the vacuum source, for example in the manner shown in FIG. 1. In the case where the user elects to eliminate sealing tape 5', perforated sheet 4' would cross resin absorbing material 10' and vacuum source 9' and seal itself to mold 1' or flange 17, as shown in FIG. 6, by the atmospheric pressure pushing down on impervious sheet 3'; the embodiment, discussed above, according to FIG. 7, is similar in this respect. In the case of the present embodiment the generally annularly-shaped rug or carpeting 10' has been placed in the inner chamber 15' immediately inwardly of coil spring 9' so as to extend between the upper face of flange portion 17 and the lower face of perforated sheet 4'. In this location the absorbent material 10' is especially effective in taking up excess resin before it reaches the coil spring and it helps distribute the vacuum. The connection of outer chamber 16' to the resin source in this instance is made by tube 7' through an opening in plastic sheet 3'.

The operation of the molding assembly of FIG. 5 is substantially the same as that described above in conjunction with the other figures. However, the embodiment of FIG. 5 vividly illustrates the advantage of the perforated sheet of giving—regardless of the shape and size of the article to be produced—the resin through the perforations of this sheet direct access to even upwardly oriented portions of the laminate without requiring the resin to flow vertically upwardly to such portions through the length of the laminate.

While only specific embodiments of the invention have been shown herein, they have been disclosed merely by way of example and they should thus not be interpreted in a limiting sense.

I claim:

1. A process for manufacturing a resin-impregnated, reinforced article while preventing resin fumes from escaping into the surrounding atmosphere, said process comprising:

depositing a permeable reinforcing material on a mold;

placing over said reinforcing material a sheet of flexible material, said sheet containing a plurality of dispersed perforations and the marginal areas of said sheet being sealed to said mold so as to define a sealed inner chamber in which said reinforcing material is contained;

placing a sheet of impervious flexible material over said sheet of perforated flexible material, with the marginal areas of the impervious sheet sealed to said mold so as to define a sealed outer chamber in which said inner chamber is contained;

effectively connecting said inner chamber to a vacuum source so as to draw the impervious sheet and, along with it the perforated sheet, against said reinforcing material; and effectively connecting said outer chamber to a source of catalyzed resin so that said resin is passed from said outer chamber into said reinforcing material through the perforations of said first-mentioned sheet, whereby said material is impregnated with resin without the escape of resin fumes into the surrounding atmosphere.

2. A process as set forth in claim 1, wherein the connection of said outer chamber to said resin source is made effective after the air has been substantially evacuated from said inner chamber, and is made ineffective at about the time when the resin has sealed said vacuum source; and wherein the vacuum in said inner chamber is maintained approximately until such time as the resin has cured.

3. A process as claimed in claim 1, wherein said depositing step includes propelling fiberglass material against the mold while simultaneously spraying a fog of adhesive until a suitable amount of fiberglass has been deposited on the mold and the adhesive allowed to tack.

4. A process as claimed in claim 3, which further comprises the step of working a squeegee over the outside of said squeegee between said impervious sheet and said perforated sheet and the resin is thus distributed over the extent of said perforated sheet without said squeegee coming in contact with the resin.

5. A process as claimed in claim 1, wherein said depositing step includes placing one or more prefabricated sheets of dry fiberglass on said mold.

6. A process as claimed in claim 1, which further comprises the step of working a roller over the outside of said impervious sheet so that a wave of resin is moved in front of said roller between said impervious sheet and said perforated sheet and the resin is thus distributed over the extent of said perforated sheet without said roller coming in contact with the resin.

7. A process for manufacturing a resin-impregnated, reinforced article while preventing resin fumes from escaping into the surrounding atmosphere, said process comprising:

depositing a permeable reinforcing material on a structure;

placing a sheet of material containing a plurality of dispersed perforations over said reinforcing material, with the marginal areas of said sheet sealed to said structure, at least in operation, so as to define a sealed inner chamber in which said reinforcing material is contained;

placing a sheet of impervious flexible material over said sheet of perforated material, with the marginal areas of the impervious sheet sealed to said structure so as to define a sealed outer chamber in which said inner chamber is contained;

effectively connecting said inner chamber to a vacuum source so as to draw the impervious sheet and, along with it the perforated sheet, against said reinforcing material; and effectively connecting said outer chamber to a source of catalyzed resin so that said resin is passed from said outer chamber into said reinforcing material through the perforations of said first-mentioned sheet, whereby said material is impregnated with resin without the escape of resin fumes into the surrounding atmosphere.

* * * * *